United States Patent
Hannig et al.

(10) Patent No.: US 11,787,098 B2
(45) Date of Patent: Oct. 17, 2023

(54) PRODUCTION LINE FOR MANUFACTURING EXTRUDED PLATES

(71) Applicant: Akzenta Paneele + Profile GMBH, Kaisersesch (DE)

(72) Inventors: Hans-Jürgen Hannig, Bergisch Gladbach (DE); Felix Hüllenkremer, Koblenz (DE); Peter Wendling, Mörsdorf (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 17/693,890

(22) Filed: Mar. 14, 2022

(65) Prior Publication Data

US 2022/0297365 A1 Sep. 22, 2022

(30) Foreign Application Priority Data

Mar. 17, 2021 (EP) .................................... 21163088

(51) Int. Cl.
*B29C 48/275* (2019.01)
*B29C 48/025* (2019.01)
(Continued)

(52) U.S. Cl.
CPC ........ *B29C 48/277* (2019.02); *B29C 48/0022* (2019.02); *B29C 48/025* (2019.02);
(Continued)

(58) Field of Classification Search
CPC . B29C 48/0022; B29C 48/025; B29C 48/355; B29C 48/9135; B29C 2793/0027;
(Continued)

(56) References Cited

U.S. PATENT DOCUMENTS 4,093,486 A * 6/1978 Honkanen ............... B32B 27/06
156/289
5,190,711 A 3/1993 Blemberg
(Continued)

FOREIGN PATENT DOCUMENTS

DE 10 2007 004247 A1 7/2008
EP 2487017 A1 * 8/2012 ............... B29B 9/06
WO WO-2010/024292 A1 3/2010

OTHER PUBLICATIONS

Translation of WO 2010/024292 (Year: 2010).*
(Continued)

*Primary Examiner* — Xiao S Zhao
*Assistant Examiner* — John J DeRusso
(74) *Attorney, Agent, or Firm* — Harness, Dickey & Pierce, P.L.C.

(57) ABSTRACT

A production line for manufacturing extruded plates, comprises a conveyor for conveying a semifinished product, an edge cutting device for cutting off an edge area of the semifinished product to present a plate-shaped endless base profile, and a separating device for separating individual plates from the endless base profile. A distance (D) between the separating device and the edge cutting device in the conveying direction is dimensioned such that, between an average temperature $T_1$ of the semifinished product during cutting of the edge area in the edge cutting device and an average temperature $T_2$ of the endless base profile during separation, there is a temperature difference $T_1-T_2$ of 2 $K \leq T_1-T_2 \leq 15$ K. Due to distance (D) within an optimum temperature range, further processing of the cut off edge areas is essentially neutral in terms of installation space.

16 Claims, 1 Drawing Sheet

(51) Int. Cl.
*B29C 48/00* (2019.01)
*B29C 48/07* (2019.01)
*B29C 48/88* (2019.01)
*B29C 48/355* (2019.01)
*B29C 48/92* (2019.01)
*B29L 7/00* (2006.01)

(52) U.S. Cl.
CPC ............ *B29C 48/07* (2019.02); *B29C 48/355* (2019.02); *B29C 48/9135* (2019.02); *B29C 48/92* (2019.02); *B29C 2793/009* (2013.01); *B29C 2793/0027* (2013.01); *B29C 2793/0063* (2013.01); *B29C 2948/92704* (2019.02); *B29C 2948/92933* (2019.02); *B29L 2007/002* (2013.01)

(58) Field of Classification Search
CPC ...... B29C 2793/0063; B29C 2793/009; B29C 2948/92704; B29C 2948/92933; B29C 48/07
See application file for complete search history.

(56) References Cited

U.S. PATENT DOCUMENTS

| 6,620,354 | B1* | 9/2003 | Bessemer | B29C 48/276 264/209.4 |
| 2007/0023953 | A1 | 2/2007 | Hartmann et al. | |
| 2022/0250282 | A1* | 8/2022 | Umeki | B29C 48/625 |

OTHER PUBLICATIONS

Translation of EP 2,487,017 (Year: 2012).*
Aug. 26, 2021. Extended European Search Report for corresponding EP Application No. 21163088.4. English translation provided.
Jun. 29, 2022. Written Opinion of the International Search Authority and International Search Report from corresponding European PCT No. PCT/DP2022/056807. Machine translation provided.

* cited by examiner

US 11,787,098 B2

PRODUCTION LINE FOR MANUFACTURING EXTRUDED PLATES

CROSS-REFERENCE TO RELATED APPLICATIONS

This application claims the benefit of European Patent Application No. 21163088.4, filed on Mar. 17, 2021. The entire disclosure of the application referenced above is incorporated herein by reference.

FIELD

The disclosure relates to a production line by means of which extruded panels can be produced. In particular, the extruded panels can be used to produce panels for covering a surface of a room.

BACKGROUND

From WO 2007/079845 A1 a production line for panels made of wood is known, in which the desired panel length can be cut off from a longer semifinished product by means of a cutting tool.

From EP 3 578 384 A1 a production line for panels made of plastic is known, in which first a plate-shaped endless profile is produced.

There is a constant need to be able to manufacture panels cost-effectively and space-saving.

It is the object of the disclosure to provide measures which enable panels to be manufactured cost-effectively and in a manner that saves installation space.

Preferred embodiments of the disclosure are provided in the subclaims and the following description, each of which may individually or in combination constitute an aspect of the disclosure.

SUMMARY

One aspect of the disclosure relates to a production line for manufacturing extruded plates, in particular for panels for covering a surface of a room, comprising a conveyor for conveying a semifinished product produced as a plate-shaped endless profile along a conveying direction at a defined conveying speed, an edge cutting device for cutting off an edge area of the semifinished product that is lateral to the conveying direction, so that in the conveying direction downstream of the edge cutting device the semifinished product is present as a plate-shaped endless base profile with a predefined base plate width extending transversely to the conveying direction, and a separating device for cutting off separated plates from the endless base profile, in particular along a cutting line extending transverse to the conveying direction, wherein a distance between the separating device and the edge cutting device in the conveying direction is dimensioned in such a way that there is a temperature difference $T_1-T_2$ of 2 $K \leq T_1-T_2 \leq 15$ K, in particular 4 $K \leq T_1-T_2 \leq 10$ K and preferably 5 $K \leq T_1-T_2 \leq 8$ K between an average temperature $T_1$ of the semifinished product when the edge area is cut-off in the edge-cutting device and an average temperature $T_2$ of the endless base profile when it is separated.

Immediately after extrusion, the extruded semifinished product is present at a temperature that is close to the melting point of the material used for the semifinished product. In this state, the semifinished product can hardly be cut into individual plates at a reasonable cost and with the required precision. Therefore, the extruded semifinished product is first cooled down. In this case, cooling can be carried out with the aid of a separate cooling device and/or by natural convection, while the semifinished product is conveyed in the conveying direction away from an associated extruder with the aid of the conveyor. The cooling of the semifinished product causes the material of the semifinished product to solidify so that it can be more easily subjected to a cutting process. Here, it was recognized that there is an optimum temperature range in which a cutting process can be carried out particularly cost-effectively and with high quality. In this optimum temperature range, the material of the semifinished product is still warm enough so that a mechanical resistance to penetration by a cutting tool is low due to the ductility still present. Wear of the cutting tool can thus be minimized. In addition, brittle fracture with an undefined fracture surface at the cutting point is avoided, so that a particularly smooth cutting surface can be achieved at the cutting point. Here, the ductility of the semifinished product may be sufficient so as to create a slight constriction at the beginning and the end of the cutting point which avoids a sharp-edged corner between the cutting surface and the top side and the bottom side of the plate-shaped semifinished product at the cutting point. Thus, there is no need for an edge breaking process at the cutting point. At the same time, the material of the semifinished product in the optimum temperature range has cooled down far enough and is hard enough so that the material does not stick to the cutting tool or deforms too much under the shear stress occurring during the cutting process. The desired shape of the separated plates can be ensured with a high degree of precision, even with high tolerance requirements, so that a high degree of dimensional accuracy is ensured for the separated plates. The material can be cut in the optimum temperature range, as with cutting through butter.

However, it has been recognized that for the purposes of the cutting processes taking place in the edge cutting device and in the separating device, it is not necessary to provide the edge cutting device and the separating device as close together as possible in order to minimize a temperature difference between the material in the edge cutting device and in the separating device. In fact, the optimum temperature range is large enough so that a cutting process in the edge cutting device and a cutting process in the separating device can be performed with substantially the same quality even if there is a significant, but not too excessive temperature difference between the two cutting processes, as indicated above for the temperature difference $T_1-T_2$. This makes it possible, taking into account the thermal boundary conditions, in particular the expected natural convection, to provide a deliberate distance in the conveying direction between the edge cutting device and the separating device at the installation site of the production line, which is defined by the expected thermal behavior of the material used for the semifinished product. The deliberately selected larger distance between the edge cutting device and the separating device allows easier accessibility and maintenance of the edge cutting device and the separating device, while at the same time maintaining a cutting process in the optimum temperature range. In particular, this provides installation space for further processing the edge areas cut off in the edge cutting device. For this purpose, an installation space can be provided between the edge cutting device and the separating device below the endless base profile as well as the conveying elements of the conveyor provided for conveying the endless base profile. The further processing of the cut-off edge areas can thus follow directly the edge cutting device without the need to significantly increase the installation space of the production line transverse to the conveying direction. Instead, the further processing of the cut-off edge areas can be provided in a mounting area that is already used by the conveying device anyway, whereby for the further processing of the cut-off edge areas a height area can be used that is rather less used by the conveyor. The further processing of the cut-off edge areas can thus be carried out in a manner that is essentially virtually neutral in terms of installation space. Due to the deliberately increased distance between the edge cutting device and the separating device, which is optimal within the scope of a cutting process and the thermally permissible boundary conditions, further processing of the cut-off edge areas can be provided in a manner that is essentially neutral in terms of installation space, so that panels can be produced cost-effectively and with a high degree of dimensional accuracy while saving installation space.

In particular, the conveyor can be composed of different subunits whose respective conveying speeds can be set the same or different. By setting different conveying speeds in different sub-areas in particular a reduction in length of the respective conveyed profile caused by cooling to the extent of a thermally induced shrinkage can be compensated, so that unnecessary stresses in the conveyed profile caused by thermal expansion effects can be compensated. In particular, the conveyor can be interrupted in the area of the separating device, so that the separating device can carry out a continuous separating cut extending transversely to the conveying direction. In this case, the sub-unit provided downstream the separating device in the conveying direction can have a higher conveying speed than a sub-unit of the conveyor provided upstream of the separating device in the conveying direction, so that the separation of the cut-off plates can be improved. The conveyor or the respective sub-unit of the conveyor can, for example, comprise actively driven and/or passively co-rotating rollers and/or a belt moved in the conveying direction in order to be able to convey the respective profile in the conveying direction. If the conveyor comprises only driven rollers as drive means for conveying the semifinished product, it is possible to provide a distance between the rollers that promotes natural convection for cooling the semifinished product, wherein the distance between successive rollers is small enough to prevent corrugation of the semifinished product in a partial area that has not yet solidified and is rather soft. The conveyor is straight at least up to the separating device, i.e. is configured without curves or bends, so that the semifinished product can be conveyed without bends along a straight line, preferably in a straight line lying in a horizontal plane.

The edge cutting device can in particular cut off the edge areas exceeding the desired base plate width continuously. For this purpose, the semifinished product can be driven against a stationary knife or cutting roller, for example. The edge areas are cut off in particular by a chipless cutting process, in particular shearing at a knife edge, so that cut chips which could contaminate and impair the edge cutting device or impair the surfaces of the endless profile are avoided. Here, the knowledge is used, that the semifinished product is comparatively soft and ductile in the optimum temperature range, so that low-wear cutting of the edge areas can easily be carried out by chipless shearing. In addition, it is possible to cut off the separated edge areas as a strip-shaped endless profile, which can subsequently be crushed into sections of the same size and shape, in particular as granules. This facilitates further processing of the cut edge areas.

The separating device can cut off the plate from the endless base profile along the separating line. The cutting of the respective plate is carried out in particular by a chipless cutting process, in particular shearing at a knife edge, so that cut-off chips which could contaminate and impair the separating device or impair the surfaces of the plate and/or of the endless base profile are avoided. Here, the knowledge is used, that the endless base profile can still be present in the optimum temperature range downstream the edge cutting device even after an intermediate slight cooling and is comparatively soft and ductile, so that a low-wear cutting of the plate can easily be carried out by chipless shearing.

The temperature measurement for measuring the average temperature $T_1$ of the semifinished product and the average temperature $T_2$ of the endless base profile is carried out in particular in a non-contact manner by means of a pyrometer at a measuring point defined in the conveying direction, preferably centered along a line-shaped measuring point extending transverse to the conveying direction. Since the semifinished product and the endless base profile have a low thickness in relation to the base plate width, the surface temperature measured in this way corresponds sufficiently well to the core temperature of the semifinished product or the endless base profile. In particular, if the cooling of the semifinished product occurs essentially by natural convection only, temperature profiles in the thickness direction caused by heat conduction effects can be neglected and the surface temperature measured contactlessly can be used as the average temperature for $T_1$ and $T_2$. In the case of cooling by forced convection, in particular with the aid of a cooling fan, or cooling with the aid of a cooling medium, for example in a water bath, the average temperature for $T_1$ and $T_2$ can preferably be determined by estimating the core temperature on the basis of the measured surface temperature, whereby in the estimation the approximate amount of heat dissipated and an associated temperature profile inside the semifinished product or the endless base profile can be taken into account.

The expected cooling of the endless base profile between the separating device and the edge cutting device, which is decisive for the distance between the separating device and the edge cutting device to be determined depending on the temperature difference $T_1-T_2$ can be estimated or even analytically calculated by taking into account the temperature, the flow velocity and the heat capacity of the medium responsible for cooling of the endless base profile. In particular, if the cooling is performed by forced or natural convection with ambient air, the ambient temperature to be expected at the installation site of the production line can be taken into account, whereby in particular also in case of a weather-related and/or seasonal temperature fluctuation of the ambient temperature, the temperatures $T_1$ and $T_2$ are still in the optimum temperature range at any time. Since the production line is usually installed in a temperature-controlled factory hall, it can be assumed that a temperature fluctuation of the ambient temperature only to a small extent, for example of ±3K, is to be expected and can be neglected if there is sufficient safety in the selected distance between the separating device and the edge cutting device. If an expected ambient temperature to be expected at the installation site should not be known, an ambient temperature of 20° C. can be assumed.

The heat flow which is dissipated between the separating device and the edge cutting device during cooling of the endless base profile depends, in the case of cooling by natural convection and a given temperature of the endless profile, according to Fourier's law essentially only on the heat transfer coefficient α and the ambient temperature $T_u$, which can be found in every section ΔD of the endless base profile extending over the entire distance D at the conveying speed $v_1$ in the area of the edge cutting device along the conveying direction at the average temperature respectively occurring in the section, wherein $T_1$ and $T_2$ lie within the optimum temperature range, i.e. $T_1$, $T_2 \geq T_{min}$ and $T_1$, $T_2 \leq T_{max}$, which results in the requirement $T_1-T_2 \leq \Delta T_{max}$. The optimum temperature range limited by $T_{min}$ and $T_{max}$ with $T_{max}-T_{min}=\Delta T_{max}$ depends mainly on the material used for the semifinished product. For the distance D between the separating device and the edge cutting device the following mathematical relationship can result under taking into account a natural convection between the separating device and the edge cutting device:

$$D=f(T_1,T_2,\alpha,T_u,v_1)$$

For the maximum distance $D_{max}$ between the separating device and the edge cutting device, $T_1=T_{min}$ and $T_2=T_{max}$ can be set, resulting in $$D_{max}=f(T_{min},T_{max},\alpha,T_u,v_1),$$

wherein the maximum distance $D_{max}$ essentially depends only on the conveying speed $v_1$ in the area of the edge cutting device as a variable parameter that can be influenced. For the actual distance D between the separating device and the edge cutting device preferably $D<D_{max}$ is satisfied in order to provide sufficient safety against fluctuations in the parameters α, $T_u$, $v_1$ and to prevent that the extension of the production line becomes unnecessarily large.

The semifinished product can be produced in particular by extrusion via a wide slot die, wherein the extruder is first being followed by a number of, in particular tempered, calender rollers so that the semifinished product can be fed to the conveyor with defined thicknesses and surface quality. The calender rollers and/or a smoothing unit for smoothing the top and/or bottom side of the semifinished product with a defined surface quality can bring about a deliberate active cooling of the material exiting from the wide slot die by means of their temperature control. A suitable composition of the extruded semifinished product is given, for example, in EP 3 578 384 A1, the content of which is hereby referred to as part of the disclosure.

In particular, the separated panels can be further processed into panels by means of which a surface of a room can be covered. For example, the panels can be used as a floor laminate to form a visually appealing floor of the room. The panel may have a panel body based on a cuboid as a basic shape, the longitudinal extension of which is usually significantly greater than its transverse extension, while the thickness of the panel body in the thickness direction is usually smaller than its transverse extension. The panel body may be formed in particular by the separated plate or a plate body obtained after at least one further cutting of the plate. The panel body can comprise on one long side extending in the longitudinal direction a bung shoulder extending in particular continuously in the longitudinal direction and projecting in the transverse direction, and on the other side a bung groove formed in the panel body in the transverse direction, so that essentially identically designed panels can be connected to one another by means of a tongue-and-groove connection in the form of a tongue-and-groove joint. In addition, a locking hook can project in the longitudinal direction from the short side of the panel body extending in the transverse direction, while a spring body can project from the other short side of the panel body, wherein the spring body delimits a receiving groove, so that essentially identically configured panels can also be interlocked with each other at their short sides by means of a tongue-and-groove joint. During assembly, the one panel may rest flat on a subsurface defining a plane of use, for example a floor, a side wall or a ceiling of a room. If necessary, the further panel can, for example, be placed slightly inclined at an angle of about 30° with an already mounted panel extending laterally next to the panel at the long side and then pivoted onto the subsurface, whereby the tongue-and-groove joint between the locking hook of the panel and the receiving groove of the further panel can be established.

In particular, for the average temperature $T_1$ of the semifinished product when cutting off the edge area in the edge cutting device a temperature in the range of 40° C.$\leq T_1 \leq$60° C., in particular 45° C.$\leq T_1 \leq$50° C. and preferably $T_1$=47° C.±2 K is intended. At such a temperature, the semifinished product is essentially at the upper limit of the optimal temperature range during the cutting of the edge area, wherein the temperature may be below the upper limit of the optimum temperature range by a safety margin of a few K. In this case, the average temperature $T_1$ of the semifinished product is at least high enough so that, even if the separating device is at a significant distance from the edge cutting device, the average temperature $T_2$ of the endless base profile during the cutting of the separated plates is also still in the optimum temperature range. The selected average temperature $T_1$ of the semifinished product is particularly suitable for an extruded thermoplastic, for example polypropylene (PP) as well as homo-, co- or terpolymers of PP, polyethylene (PE), thermoplastic elastomers such as thermoplastic polyolefins (TPO), thermoplastic styrenes (TPS), thermoplastic polyurethane (TPU), thermoplastic vulcanizates (TPV) or thermoplastic copolyesters (TPC). All of the aforementioned thermoplastics can also include fillers, such as chalk, layered silicates or rock flour, in a customary manner. In order to adapt the physicochemical properties of the plastics, it may furthermore be provided that the plastics comprise further additives modifying the corresponding properties of the plastic, such as plasticizers, UV stabilizers, antioxidants, flame retardants, antistatics, impact strength modifiers and/or colorants.

Preferably, for a cooling of the endless base profile between the edge cutting device and the separating device, cooling is provided exclusively by convection, in particular exclusively by natural convection. The expense of active cooling, in particular with the aid of an additional coolant, is thus avoided and saved. In addition, internal stresses caused by excessive cooling can be avoided. A cooling heat flow provided in the area between the edge cutting device and the separating device can thus be deliberately kept comparatively low, so that a temperature difference between the temperature during the cutting of the edge areas and during the cutting of the separated plates can be rather small while selecting a deliberately large spatial distance between the edge cutting device and the separating device. As appropriate, heat can even be deliberately applied to the endless base profile, for example with the aid of radiant heaters, in order to ensure that the best possible cutting result can be obtained both in the edge cutting device and in the separating device while the distance between the separating device and the edge cutting device is as large as possible.

Particularly preferably, the edge cutting device provides chipless cutting of the edge area from the semifinished product, in particular with the aid of a cutting tool configured as a cutting roller. Here, the knowledge is used that the semifinished product is comparatively soft and ductile in the optimal temperature range, so that a low-wear cutting of the edge areas can be easily carried out by means of chipless shearing. Due to the chipless cutting process in the edge cutting device, cut-off chips can be avoided, which could contaminate the edge cutting device and impair its operation. In addition, it is avoided that chips are deposited on the still soft and ductile surface of the semifinished product and/or the endless base profile and remain stuck there. An impairment of the surface quality of the endless base profile by cut-off chips is avoided. In addition, it is not necessary to suck off cut-off chips, so that a cost-effective and reliable cutting process is provided for cutting off the edge areas.

In particular, the separating device provides chipless cutting of the plate from the endless base profile with the aid of a cutting tool, wherein in particular the cutting tool of the separating device is configured to be co-movable at the conveying speed of the endless base profile in the conveying direction. Here, the knowledge is used that the endless base profile is comparatively soft and ductile in the optimum temperature range, so that a low-wear cutting of the separated plate can be easily carried out by chipless shearing. The chipless cutting process in the separation device can avoid cut-off chips that could contaminate the separation device and impair its operation. In addition, chips are prevented from reaching the still soft and ductile surface of the endless base profile and/or the plate and remain stuck thereto. An impairment of the surface quality of the plate by cut-off chips is avoided. In addition, it is not necessary to suck off cut-off chips, so that a cost-effective and reliable cutting process is provided for the cutting of the plates. By co-moving the cutting tool in the conveying direction at the same speed as the endless base profile, a proper cut edge can be produced, as could otherwise only be produced by cutting a stationary workpiece. A bevelled cut surface of the plate can thus be avoided, so that the plate essentially corresponds to a cuboid.

Preferably, a collecting container for collecting the edge areas cut in the edge cutting device is arranged In the conveying direction between the edge cutting device and the separating device. Due to the deliberately increased distance between the separating device and the edge cutting device in the conveying direction, the collecting container can be positioned in the area of the conveyor, so that the collecting container can be provided almost without affecting the installation space. The edge areas cut as a strip-shaped endless profile can still be connected to the semifinished product upstream of the cutting tool of the edge cutting device, so that the cut-off edge areas can extend only slightly laterally spaced from the endless base profile in the conveying direction downstream of the cutting tool of the edge cutting device. The cut-off edge areas can thus easily be fed to the collecting container provided between the edge cutting device and the separating device, without the edge areas cut off as a strip-shaped endless profile being able to break off in an uncontrolled manner. The cut-off edge areas can thus easily be continuously discharged and collected in the collecting container. The edge areas cut-off as a strip-shaped endless profile can break into smaller pieces in the collecting container or be crushed in a defined manner beforehand. In particular, the collecting container can be moved away by a relative movement transverse to the conveying direction and replaced by a collecting container that is still empty, so that the cut-off edge areas can be taken away batch by batch.

Particular preferably, the collecting container can be arranged below the endless base profile in the direction of gravity, wherein the endless base profile in particular covers the collecting container at least to a large extent when viewed in the direction of gravity. A lateral protrusion of the collecting container beyond the lateral extension of the endless base profile can thus be kept to a minimum or even avoided entirely. The installation space requirement can thus be minimized. In addition, it is easily possible to design the collecting container open at the top, so that a visual inspection easily enables to determine whether the collecting container should be replaced by an empty one. The components of the conveying device provided above the collecting container, in particular rollers, and/or the material of the endless base profile can cover the opening of the collecting container which is open at the top and hold back broken pieces of the cut-off edge area jumping up from the inside of the collecting container.

In particular, the collecting container is equipped with a return conveyor for conveying the contents of the collecting container into a recycling container, whereby in particular the recycling container for at least partial and/or temporary loading of an extruder for producing the semifinished product with an educt originating from the recycling container can be connected to the extruder. The return conveyor can, for example, discharge the pieces of the edge areas collected in the collecting container by means of a screw drive and/or by a pneumatically generated pressure or vacuum. In particular, the cut-off edge areas can be completely recycled and reused for the production of the semifinished product. The cut-off edge pieces collected in the recycling container can correspond almost identically to the composition of a non-recycled, i.e. virgin, educt, so that in the molten state they are essentially indistinguishable from the non-recycled virgin educt and can be mixed well with the latter. With the aid of the return conveyor, a substantially continuous discharge and/or admixture of the cut-off edge pieces to the educt for the extruder can be realized.

Preferably, at least one crushing device for crushing the edge area cut off as a strip-shaped endless profile is provided in the conveying direction between the edge cutting device and the separating device, wherein the crushing device is configured to feed crushed edge pieces produced in the crushing device from the cut-off edge area to a collecting container, wherein in particular the crushing device is provided in the conveying direction between the edge cutting device and the collecting container. Due to the selected larger distance between the separating device and the edge cutting device the crushing device can be disposed in the immediate vicinity of the separating device, without significantly increasing the installation space requirement of the production line. The edge area cut off as a strip-shaped endless profile can be crushed in the conveying direction downstream of the edge cutting device of the crushing device, for example a cutting mill with a rotating rotor knife as a crushing tool, into pieces of almost equal size. The edge area crushed in the crushing device, in particular chipless, can be present, for example, as strip-shaped granules which can subsequently be easily conveyed away, for example pneumatically. Due to the three-dimensional shape of the crushed edge area, which varies at most only slightly, if at all, a subsequent processing of the crushed edge area is simplified. In particular, the crushed edge area can be recycled easily and with virtually no rejects.

Particularly preferably, a first crushing device for crushing a first edge area cut at a first edge of the semifinished product and a second crushing device for crushing a second edge area cut at a second edge of the semifinished product facing away from the first edge are provided, wherein both the first crushing device and the second crushing device are arranged in the conveying direction between the edge cutting device and the collecting container, wherein both the first crushing device and the second crushing device convey the edge pieces produced in the respective crushing device to the same collecting container. The first crushing device and the second crushing device can be positioned in the immediate vicinity of the point where the corresponding edge area is cut off in the edge cutting device. Excessive bending of the cut-off edge area present in the form of a strip-shaped endless profile and/or an excessive installation space requirement in the conveying direction can thus be avoided. The cut-off edge area can be fed to the respective crushing device without the risk of breaking off. The edge areas crushed in the first crushing device and in the second crushing device can be collected in the common collecting container, which can be installed in a space-saving manner in an intermediate space between the first and the second crushing device transverse to the conveying direction. In this case, it is possible for the collecting container and the crushing devices to be arranged in a common conveying section, so that in a horizontal viewing direction transverse to the conveying direction, the collecting container and the crushing devices can overlap one another. It is also possible, however, for the collecting container to be arranged offset relative to the crushing devices in the conveying direction, in order to permit easy replacement of the collecting container by a relative movement of the full and the empty collecting container transversely to the conveying direction, in particular if the distance between the separating device and the edge cutting device required for this purpose still ensures the intended temperature difference $T_1-T_2$.

In particular, the at least one crushing device is arranged below the endless base profile in the direction of gravity, wherein in particular the endless base profile covers the at least one crushing device at least to a large extent when viewed in the direction of gravity. A lateral protrusion of the crushing device beyond the lateral extension of the endless base profile can thus be kept low or even be avoided completely. The installation space requirement of the production line can thus be minimized.

Particularly preferably, a cutting device is provided downstream of the separating device in the conveying direction for cutting the plate, in particular chipless, into individual panels, in particular along at least one cutting line extending in the conveying direction, wherein a distance between the cutting device and the separating device in the conveying direction is dimensioned in such a way that between an average temperature $T_2$ of the endless base profile during the separating process in the separating device and an average temperature $T_3$ of the plate during the cutting process in the cutting device, there is a temperature difference $T_2-T_3$ of 0 $K \leq T_2-T_3 \leq 20$ K, in particular 3 $K \leq T_2-T_3 \leq 15$ K and preferably $T_2-T_3=5$ K±2 K. As a result, the cutting of the plate into panels, respectively into panel bodies intended for the production of panels, can take place in a temperature range that is still in the optimal temperature range or slightly below it. Since the cutting device does not process an endless profile, but already cut plates, preferably chipless, a good cutting result with plane cut surfaces can also be achieved at a lower temperature. Instead of continuous cutting, the cutting device can provide batch-type cutting with the aid of at least one knife, wherein, due to the lower temperature, it is easily possible to press the panels to be cut with the aid of at least one downholder without the fear of wave-like deformation of the plate and the panels to be cut off. The cutting process in the cutting device can thus be carried out with a high precision and a good cutting quality.

The separated plates and/or panels can be stacked towards the end of the conveyor in a packaging device, preferably on a pallet. The stacked plates and/or panels can, in particular after cooling to ambient temperature, be subjected to further processing, in particular machining, for example to form a bung shoulder, a bung groove, a locking hook or a spring body in the side faces connecting the top side with the bottom side.

In particular, the conveyor provides a conveying speed $v_1$ of 4.5 m/min$\leq v_1 \leq$21.0 m/min, in particular 5.0 m/min$\leq v_1 \leq$8.0 m/min and preferably $v_1$=5.5 m/min±0.5 m/min or $v_1$=7.5 m/min±0.5 m/min. This conveying speed allows high productivity without inducing unnecessary internal stresses in the semifinished product. Moreover, even if the distance between the separating device and the edge cutting device is deliberately chosen to be greater than absolutely necessary, this conveying speed allows both the edge cutting device and the separating device to carry out a cutting process in the optimum temperature range.

In addition or alternatively, the conveying speed $v_1$ is set in such a way that a certain, in particular essentially constant, extruder throughput, for example 6000 kg/h or 8500 kg/h, is achieved for a predetermined thickness and a predetermined base plate width of the plates to be produced. The conveying speed $v_1$ can thus be adapted to the maximum extruder throughput that can be provided by the extruder, whereby a particularly high productivity is achieved. The conveying speed $v_1$ can thus be defined as a function of the thickness d of the plate in the thickness direction, the base plate width b and the maximum extruder throughput $q_{m,max}$, so that $$v_1=f(d,b,q_{m,max})$$

applies. Thus, for the maximum distance $D_{max}$ between the separating device and the edge cutting device $$D_{max}=f(T_{min},T_{max},\alpha,T_w,d,b,q_{m,max})$$

can be obtained. The maximum distance $D_{max}$ depends in this case only on the performance of the extruder, the material properties of the material suitably selected for the plates, and the suitably chosen geometry of the plates. This makes it possible to check a suitable distance D between the separating device and the edge cutting device for a certain number of product variants of plates to be manufactured already during the planning and design of the production line.

It is preferably provided that the conveyor exerts a compressive force pointing in the conveying direction at an initial region of the semifinished product facing an extruder and present in particular in an essentially pasty state, and a pulling force pointing in the conveying direction to an end region of the endless base profile facing the separating device and present in particular in an essentially solid state, wherein the exerted compressive forces and pulling forces being dimensioned in such a way that at least a large part of the compression and stretching caused by thermal expansion effects during cooling of the semifinished product is compensated. Here, in particular, the conveying speed along the conveying direction can be adapted locally in such a way that thermal expansion effects due to cooling along the conveying direction and shrinkage of the semifinished product in the conveying direction can be compensated. The compressive force acting on the soft end of the semifinished product can be built up in particular by subsequent extruded material, while the pulling forces at the already sufficiently solidified regions of the semifinished product can be provided by an actively acting conveying element of the conveying device. Unnecessary internal stresses in the semifinished product can thus be avoided, so that unwanted deformation, for example wave formation, of the semifinished product can be avoided.

DRAWINGS

In the following, the disclosure will be explained by way of example with reference to the accompanying drawings based on preferred exemplary embodiments, wherein the features shown below can each represent an aspect of the disclosure both individually and in combination. In the drawings.

DETAILED DESCRIPTION

Figure 1:
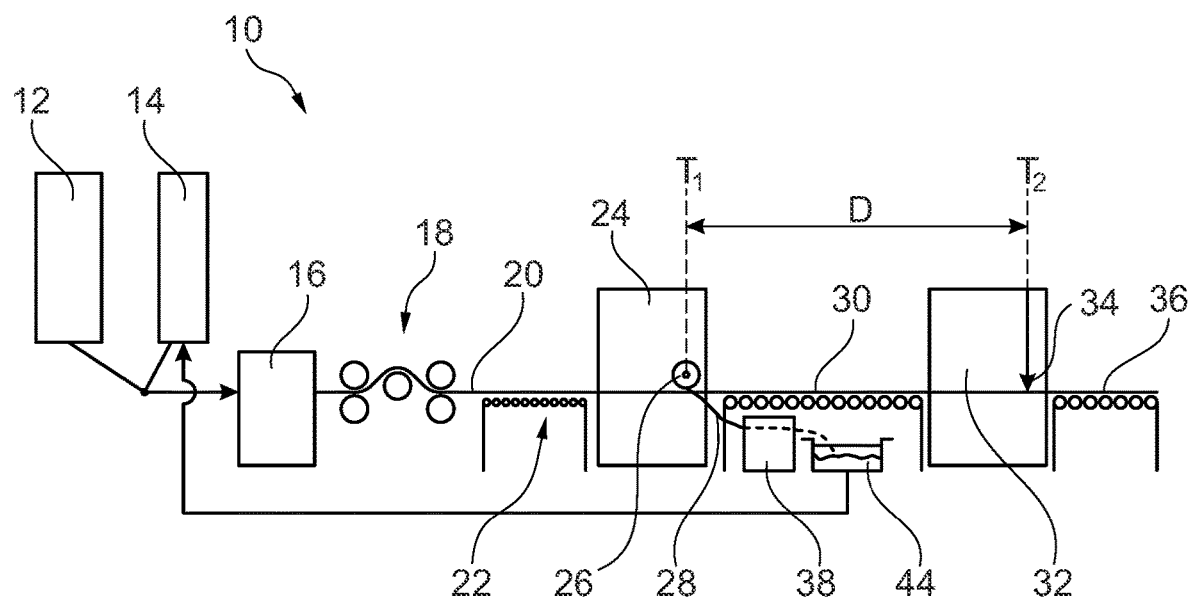
FIG. 1 shows a schematic principle representation of a production line.

The production line 10 shown in FIG. 1 comprises a storage container 12 and a recycling container 14, from which an extruder 16 can be supplied with an educt to be extruded. The extruder 16 can feed the educt via a wide slot die to a calender 18, so that downstream the calender a semifinished product in the form of a plate-shaped endless profile is present, which can be conveyed by a conveyor 22 in the conveying direction at a certain conveying speed. Here, the semifinished product 20 can be cooled during conveying, in particular by natural convection, wherein the local conveying speed of the conveyor 22 can be adapted in such a way that thermal expansion effects can be compensated by shrinkage of the material of the semifinished product. The semifinished product can be supplied from the conveyor 22 to an edge cutting device 24, which, at an average temperature $T_1$ of the semifinished product 20, in particular with the aid of a rolling cutter 26, cuts off edge strips 28 so that an endless base profile 30 with straightened side edges and a defined base plate width transverse to the conveying direction remains on the conveyor 22. The endless base profile 30 is then fed to a separating device 32, which at an average temperature $T_2$ of the endless base profile 30 cuts off separated plates 36, in particular with the aid of a guillotine blade 34 co-moved in the conveying direction. The average temperature $T_1$ of the semifinished product 20 in the edge cutting device 24 and the average temperature $T_2$ of the endless base profile 30 in the separating device 32 both lie within a comparatively narrow optimum temperature range in which the material of the semifinished product 20 and of the endless base profile 30 is still warm enough so that, due to the ductility still present, a mechanical resistance to penetration by a cutting tool is low, but is already hard enough so that the material does not remain stuck to the cutting tool or deforms too much under the shear stress occurring during the cutting process.

The actual width of the optimum temperature range is utilized to the extent that a distance D between the separating device 32 and the edge cutting device 24 is deliberately chosen to be greater than the minimum required, wherein the distance D is small enough to prevent excessive cooling of the endless base profile 30 by natural convection. This makes it possible to feed the edge areas 28, which have been cut off as strip-shaped endless profiles, to an associated first crushing device 38 and a second crushing device 40, respectively, in which the edge areas 28 can be crushed into edge pieces 42 of substantially the same size and fed to a common collecting container 44. From the collecting container 44, the edge pieces 42 can, for example with the aid of a return conveyor, be fed to the recycling container 14 and reused.

Due to the deliberately larger chosen distance D, the crushing devices 38, 40 and the collecting container 44 can be accommodated in the conveying direction between the separating device 32 and the edge cutting device 24, in particular below the conveying device 22 and the endless base profile 30, in a manner that saves installation space.

Figure 2:
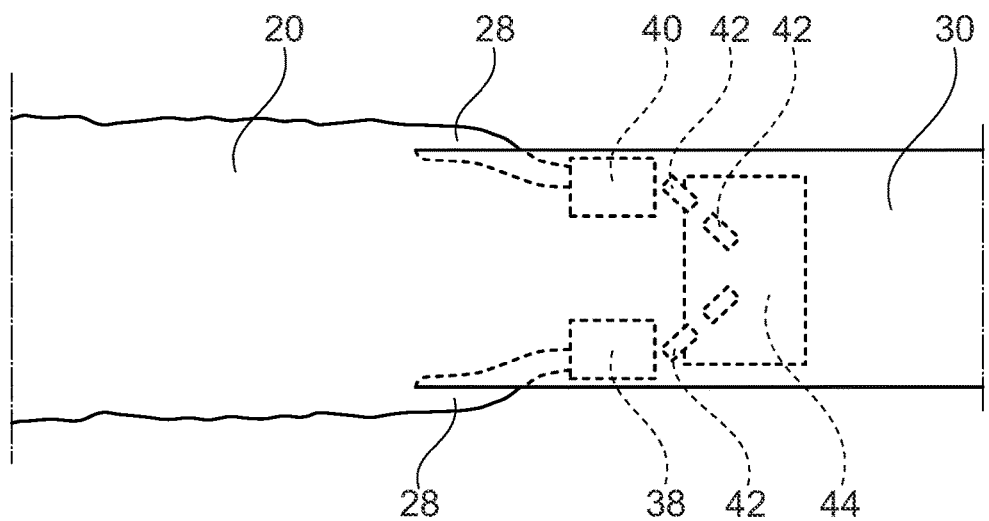
FIG. 2 shows a schematic top view of a semifinished product produced by the production line of FIG. 1.

As shown in FIG. 2, it is even possible to dispose the crushing devices 38, 40 and the collecting container 44 to a large extent, preferably completely, below the endless base profile 30. In this case, a certain elasticity of the edge areas cut off as strip-shaped endless profiles transversely to the conveying direction can be utilized. Alternatively, the crushing devices 38, 40 and/or the collecting container 44 may protrude laterally somewhat beyond the endless base profile 30.

What is claimed is:

1. A production line for manufacturing extruded plates for panels for covering a surface of a room, comprising
   a conveyor for conveying a semifinished product produced as a plate-shaped endless profile along a conveying direction at a defined conveying speed;
   an edge cutting device for cutting off an edge area of the semifinished product which is lateral with respect to the conveying direction, so that in the conveying direction downstream of the edge cutting device, the semifinished product is formed as a plate-shaped endless base profile with a predefined base plate width extending transversely to the conveying direction; and
   a separating device for cutting off separated plates from the endless base profile along a cutting line extending transversely to the conveying direction,
   wherein a distance (D) between the separating device and the edge cutting device in the conveying direction is dimensioned in such a way that, between an average temperature $T_1$ of the semifinished product when the edge area is cut off in the edge cutting device and an average temperature $T_2$ of the endless base profile during the separation process, there is a temperature difference $T_1-T_2$ of $2\ K \leq T_1-T_2 \leq 15\ K$.

2. The production line according to claim 1, wherein the average temperature $T_1$ of the semifinished product when cutting off the edge area in the edge cutting device is $40°\ C. \leq T_1 \leq 60°\ C.$ 3. The production line according to claim 1, wherein cooling of the endless base profile between the edge cutting device and the separating device is provided exclusively by convection.

4. The production line according to claim 1, wherein the edge cutting device provides a chipless cutting of the edge area from the semifinished product.

5. The production line according to claim 1, wherein the separating device provides a chipless cutting of the plates from the endless base profile with the aid of a cutting tool, wherein the cutting tool of the separating device is configured to be co-movable at the conveying speed of the endless base profile in the conveying direction.

6. The production line according to claim 1, wherein a collecting container for collecting the edge area cut off in the edge cutting device is arranged in the conveying direction between the edge cutting device and the separating device.

7. The production line according to claim 6, wherein the collecting container is arranged below the endless base profile in the direction of gravity, wherein the endless base profile covers a majority of the collecting container as viewed in the direction of gravity.

8. The production line according to claim 6, wherein the collecting container is connected to a return conveyor for conveying the contents of the collecting container into a recycling container, wherein the recycling container can be connected to an extruder for at least partial and/or temporary loading of the extruder for producing the semifinished product with a material originating from the recycling container.

9. The production line according to claim 1, wherein at least one crushing device for crushing the edge area cut off as a strip-shaped endless profile is provided in the conveying direction between the edge cutting device and the separating device, wherein the at least one crushing device is configured to feed crushed edge pieces produced in the at least one crushing device from the cut-off edge area to a collecting container, wherein the at least one crushing device is provided in the conveying direction between the edge cutting device and the collecting container.

10. The production line according to claim 9, wherein the at least one crushing device comprises a first crushing device for crushing a first edge area cut off at a first edge of the semifinished product and a second crushing device for crushing a second edge area cut off from a second edge of the semifinished product facing away from the first edge are provided, wherein both the first crushing device and the second crushing device are provided in the conveying direction between the edge cutting device and the collecting container, wherein both the first crushing device and the second crushing device feed the edge pieces produced in the respective crushing device to the collecting container.

11. The production line according to claim 9, wherein the at least one crushing device is arranged below the endless base profile in the direction of gravity, wherein the endless base profile covers a majority of the at least one crushing device, as viewed in the direction of gravity.

12. The production line according to claim 1, wherein, downstream of the separating device in the conveying direction, a cutting device for cutting the plates into individual panels is provided along at least one cutting line extending in the conveying direction, wherein a distance between the cutting device and the separating device in the conveying direction is dimensioned in such a way that, between the average temperature $T_2$ of the endless base profile during the separation in the separating device and an average temperature $T_3$ of the plates (36) during cutting in the cutting device, there is a temperature difference $T_2-T_3$ of $0\ K \leq T_2-T_3 \leq 20\ K$.

13. The production line according to claim 1, wherein the conveyor provides a conveying speed $v_1$ of $4.5\ m/min \leq v_1 \leq 21.0\ m/min$.

14. The production line according to claim 13, wherein the conveyor exerts a compressive force pointing in the conveying direction at an initial region of the semifinished product which faces towards an extruder and is present in a pasty state and a pulling force pointing in the conveying direction at an initial region of the semifinished product which faces towards the separating device and is present in a substantially solid state, wherein the compressive force and pulling force acting are dimensioned in such a way that compression and stretching caused by thermal expansion effects during cooling of the semifinished product are compensated at least to a majority extent.

15. A production line for manufacturing extruded plates for panels for covering a surface of a room, comprising
a conveyor for conveying a semifinished product produced as a plate-shaped endless profile along a conveying direction at a defined conveying speed;
an edge cutting device for cutting off an edge area of the semifinished product which is lateral with respect to the conveying direction, so that in the conveying direction downstream of the edge cutting device, the semifinished product is formed as a plate-shaped endless base profile with a predefined base plate width extending transversely to the conveying direction; and
a separating device for cutting off separated plates from the endless base profile along a cutting line extending transversely to the conveying direction,
wherein a distance (D) between the separating device and the edge cutting device in the conveying direction is dimensioned in such a way that, between an average temperature $T_1$ of the semifinished product when the edge area is cut off in the edge cutting device and an average temperature $T_2$ of the endless base profile during the separation process, there is a temperature difference $T_1-T_2$ in the range of $4\ K \leq T_1-T_2 \leq 10\ K$.

16. A production line for manufacturing extruded plates for panels for covering a surface of a room, comprising
a conveyor for conveying a semifinished product produced as a plate-shaped endless profile along a conveying direction at a defined conveying speed;
an edge cutting device for cutting off an edge area of the semifinished product which is lateral with respect to the conveying direction, so that in the conveying direction downstream of the edge cutting device, the semifinished product is formed as a plate-shaped endless base profile with a predefined base plate width extending transversely to the conveying direction; and
a separating device for cutting off separated plates from the endless base profile along a cutting line extending transversely to the conveying direction,
wherein a distance (D) between the separating device and the edge cutting device in the conveying direction is dimensioned in such a way that, between an average temperature $T_1$ of the semifinished product when the edge area is cut off in the edge cutting device and an average temperature $T_2$ of the endless base profile during the separation process, there is a temperature difference $T_1-T_2$ in the range of $5\ K \leq T_1-T_2 \leq 8\ K$.

* * * * *